US011651416B2

(12) United States Patent
Fujisawa

(10) Patent No.: US 11,651,416 B2
(45) Date of Patent: May 16, 2023

(54) GOODS PURCHASE ANALYSIS ASSIST SYSTEM

(71) Applicant: Kazunori Fujisawa, Tokyo (JP)

(72) Inventor: Kazunori Fujisawa, Tokyo (JP)

( * ) Notice: Subject to any disclaimer, the term of this patent is extended or adjusted under 35 U.S.C. 154(b) by 165 days.

(21) Appl. No.: 17/074,748

(22) Filed: Oct. 20, 2020

(65) Prior Publication Data

US 2021/0272174 A1 Sep. 2, 2021

(30) Foreign Application Priority Data

Sep. 13, 2019 (JP) .............................. JP2019-166958

(51) Int. Cl.
| | | |
|---|---|---|
| *G06Q 30/0601* | (2023.01) | |
| *G07C 9/38* | (2020.01) | |
| *G06K 7/14* | (2006.01) | |
| *G06K 7/10* | (2006.01) | |
| *G06Q 20/32* | (2012.01) | |
| *H04N 7/18* | (2006.01) | |
| *G07C 9/10* | (2020.01) | |
| *G06Q 10/087* | (2023.01) | |
| *G06K 19/06* | (2006.01) | |
| *G06K 19/07* | (2006.01) | |
| *G06Q 40/02* | (2023.01) | |
| *G06V 20/00* | (2022.01) | |

(52) U.S. Cl.
CPC ..... *G06Q 30/0633* (2013.01); *G06K 7/10297* (2013.01); *G06K 7/1417* (2013.01); *G06Q 20/3276* (2013.01); *G06Q 20/3278* (2013.01); *G06Q 30/0613* (2013.01); *G07C 9/10* (2020.01); *G07C 9/38* (2020.01); *H04N 7/183* (2013.01); *G06K 19/06037* (2013.01); *G06K 19/0723* (2013.01); *G06K 2007/10504* (2013.01); *G06Q 10/087* (2013.01); *G06Q 40/02* (2013.01); *G06V 20/00* (2022.01)

(58) Field of Classification Search
None
See application file for complete search history.

(56) References Cited

FOREIGN PATENT DOCUMENTS

| | | | |
|---|---|---|---|
| JP | 2013-541107 A | | 11/2013 |
| JP | 2013235309 A | * | 11/2013 |

(Continued)

OTHER PUBLICATIONS

Office action for the corresponding JP application No. 2019-116958 dated Jan. 26, 2021 and English translation thereof.

*Primary Examiner* — Kristy A Haupt
(74) *Attorney, Agent, or Firm* — Muncy, Geissler, Olds & Lowe, P.C.

(57) ABSTRACT

A goods purchase analysis assist system is provided that can not only prevent checkouts from being crowded, but also perform settlement at timing convenient for the customer. A goods purchase analysis assist system includes a management server that communicates with a terminal of a customer, and manages purchase of goods in a store by the customer, wherein gates for managing entry and exit of the customer are installed in the store, gates for exit among the gates are configured as a first exit gate through which the customer having performed shopping passes, and a second exit gate through which the customer having not performed shopping passes, and the management server manages entry and exit of the customer passing through the gate.

6 Claims, 15 Drawing Sheets

(56) References Cited

FOREIGN PATENT DOCUMENTS

| | | |
|---|---|---|
| JP | 2015-148846 A | 8/2015 |
| JP | 2015-148918 A | 8/2015 |
| JP | 6303160 B1 * | 4/2018 ........... G06Q 20/208 |

* cited by examiner

GOODS PURCHASE ANALYSIS ASSIST SYSTEM

BACKGROUND OF THE INVENTION

Field of the Invention

The present invention relates to a checkout system for checking out goods that customers intend to purchase at a retail store or the like and, in more detail, to a goods purchase analysis assist system for assisting analysis of presence or absence and the like of goods purchase by customers at an unattended retail store or the like.

Description of the Related Art

Conventionally, for the sake of preventing checkouts from being crowded, a technique for assisting checkout process at a store has been provided.

For example, a method of purchasing goods by a customer or the like using a mobile device has been proposed (National Publication of International Patent Application No. 2013-541107).

That is, National Publication of International Patent Application No. 2013-541107 discloses a method for purchasing goods using a mobile device including: a step of inputting, into the mobile device, identification information identifying the goods to be purchased; a step of generating an order for the goods identified by the identification information; a step of displaying an optical machine-readable representation of the order, on a display of the mobile device; a step of scanning the optical machine-readable representation of the order from the display of the mobile device with an optical scanning machine; a step of transmitting the scanned representation of the order to a remote server to obtain the order; a step of obtaining the order from the remote server using the scanned representation of the order, the order including a total payment amount; and a step of requesting payment from a user of the mobile device for the total payment amount.

Furthermore, a handy terminal automatic settlement system capable of achieving unattended checkout registers and smoothly performing a settlement process without making customers wait at the checkout, has also been proposed (Japanese Patent Laid-Open No. 2015-148846).

That is, Japanese Patent Laid-Open No. 2015-148846 discloses a handy terminal automatic settlement system that includes a handy terminal, and a goods comparison device, and performs electronic settlement through a customer's IC card inserted into the handy terminal. The handy terminal includes: an identification information reader that reads, in a non-contact manner, goods identification information assigned to goods; a card lock mechanism that, when the customer's IC card is inserted therein, locks discharge thereof; and a communication unit that communicates with the goods comparison device. The goods comparison device includes a card lock releaser that executes the settlement using the IC card and generates a control signal for releasing the lock of the card lock mechanism of the handy terminal, when a purchase wish list obtained through communication with the handy terminal entirely coincides with a goods list obtained through non-contact reading of the goods identification information assigned to the goods stored in a shopping basket or a shopping cart of the customer.

An accounting service support device has also been proposed that can reduce unnecessary notification by optimizing the timing of notification on the basis of a video obtained by imaging the inside of a store when notifying a clerk of an instruction to take action to reduce customers' waiting time for checkout (Japanese Patent Laid-Open No. 2015-148918).

That is, Japanese Patent Laid-Open No. 2015-148918 discloses an accounting service support device for supporting a checkout service at a shop so as to reduce customers' checkout waiting time on the basis of a video obtained by imaging the inside of the shop, the device including: a checkout waiting state detector that detects states of checkout waiting customers, on the basis of a video obtained by imaging a checkout waiting area in which checkout waiting customers staying at checkout register devices; an intra-shop person state detector that detects states of persons staying in the shop on the basis of the video obtained by imaging the inside of the shop; a notification determiner that determines whether a notification for determining the action of reducing the customers' checkout waiting on the basis of a detection result of the checkout waiting state detector and a detection result of the intra-shop person state detector can be issued or not; and a notifier that issues the notification on the basis of the determination result of the notification determiner.

SUMMARY OF THE INVENTION

Technical Problem

Unfortunately, in the conventional arts disclosed in National Publication of International Patent Application No. 2013-541107, Japanese Patent Laid-Open No. 2015-148846, and Japanese Patent Laid-Open No. 2015-148918, in a case where goods are sold at the store, payment and settlement are made in the store in principle. An environment of allowing settlement by a purchaser (customer) at convenient timing is not prepared. Furthermore, behavior or the like of a customer having once picked up goods but having not purchased as a result cannot be efficiently collected in marketing view.

That is, even in the case where the goods are sold at the store, it is preferable to achieve improvement so as to allow the customer (purchaser) to select goods freely in the store and allow settlement at timing convenient for the customer also in and out of the store, because in addition to solving the conventional problems on the store side, such as prevention of checkouts from being crowded, the customer's convenience is further improved. Furthermore, data collection means is required that is beneficial for allowing analysis of various purchase needs and the like of customers, such as customers having picked up goods once but having not purchased as a result.

Solution to Problem

A goods purchase analysis assist system according to one embodiment of the present invention includes a management server that communicates with a terminal of a customer, and manages purchase of goods in a store by the customer, wherein gates for managing entry and exit of the customer are installed in the store, gates for exit among the gates are configured as a first exit gate through which the customer having performed shopping passes, and a second exit gate through which the customer having not performed shopping passes, and the management server manages entry and exit of the customer passing through the gate.

Advantageous Effects of Invention

The goods purchase analysis assist system according to one embodiment of the present invention can provide a system and the like that can improve the customer's convenience, such as of capability of settlement at timing convenient for the customer for allowing analysis of various purchase needs and the like of customers.

DETAILED DESCRIPTION OF THE PREFERRED EMBODIMENTS

Hereinafter, a goods purchase analysis assist system according to one embodiment of the present invention is described in detail with reference to the drawings.

Figure 1:
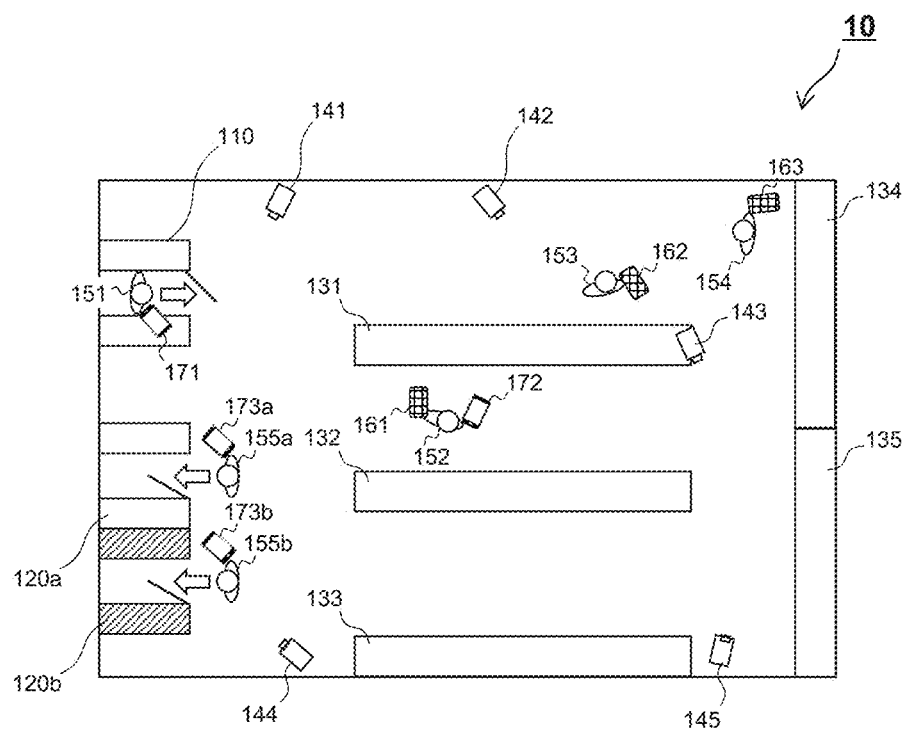
FIG. 1 exemplarily illustrates situations in an unattended store pertaining to a goods purchase analysis assist system according to one embodiment of the present invention.

FIG. 1 schematically shows situations at a store in the goods purchase analysis assist system according to one embodiment of the present invention. The present invention is not limited thereto. There is no need to allocate clerks, staff members and the like at the store.

In this sense, description is made assuming that the store is an unattended store (reference numerals 151 to 155 in this diagram indicate the customer as described later).

In this diagram, the store 10 adopts a configuration that includes gates 110, 120a and 120b serving as a gateways between this store and the outside, store shelves 131 to 135 installed in the store (goods, not shown, are displayed on each shelf), and cameras 141 to 145 installed in the store (besides, a management server and the like are included in view of the entire system; these are described later).

The gates 110, 120a and 120b are management gates for managing customers' entry into and exit from the store 10 (entry and exit).

In particular, the gates 120a and 120b are exit gates that two types of customers respectively use. In one embodiment of the present invention, the exit gate 120a is a gate that customers having actually purchased goods or intending to purchase goods use. The exit gate 120b is a gate that customers having not purchased goods use.

In FIG. 1, a customer 151 waves a terminal 171 owned by them over the entrance of a gate 110, thereby being allowed to enter the store 10. For example, the situations are imaged by the cameras 141 and/or 144 installed in the store 10, and a recognition process is appropriately performed (for example, types of customers and time when they enter. More specifically, customers, baggage and the like can be individually identified by an existing image recognition technique).

Meanwhile, a customer 155a having finished shopping waves a terminal 173a over an exit of the gate 120a, thereby being allowed to go out to the outside of the store 10. As required, these situations may be imaged by the cameras 141 and/or 144 installed in the store 10, and the recognition process can be appropriately performed. In one embodiment of the present invention, settlement can be achieved in the store 10. Alternatively, retrospective settlement can be made through the terminal 173a outside of the store 10. In one embodiment, a terminal of a customer having already made settlement in the store 10 is caused to display a message "Thank you. We are looking forward to seeing you again at the store." on a terminal screen, not shown. A terminal of a customer scheduled to make retrospective settlement is caused to display a message "Please pay later" on a terminal screen, not shown.

Meanwhile, a customer 155b having bought nothing waves a terminal 173b over an exit of the gate 120b, thereby being allowed to go out to the outside of the store 10. As required, these situations may be imaged by the cameras 141 and/or 144 installed in the store 10, and the recognition process can be appropriately performed. In one embodiment, the terminal of the customer having bought nothing is caused to display a message "Thank you. We are looking forward to seeing you again at the store." on the terminal screen, not shown.

Note that in another embodiment of the present invention, waving the terminal over for passing the entry and exit gates 110, 120a and 120b is not necessarily required, and settlement can be made in the store using a shopping basket (161 to 163 in FIG. 1) given at entry.

[Sales Management]

The goods purchase analysis assist system according to one embodiment of the present invention can also perform sales management of goods and the like. The goods purchase analysis assist system according to one embodiment of the present invention can operate in cooperation with store POS registers and a mail-order (electronic commerce) system, not shown, and also manage sales achievements at the store and sales achievements through mail order on a customer-by-customer basis. As databases therefor, in one embodiment, the following databases (D1) to (D5) are included in the management server, thereby allowing reference and access from after-mentioned various terminals with reference to FIG. 2.

(D1) Customer Management Database

A database that registers items pertaining to customers registers personal information, such as customer names, addresses, and phone numbers, and supplementary information, such as held points, and frequently used stores.

(D2) Goods Management Database

A database that registers items pertaining to goods registers and manages goods names, goods codes associated with JAN codes and the like.

(D3) Stock Management Database

A database that manages goods stocks at each of the other sales sites and stores, not shown, appropriately cooperate with the goods management database, and derives and extracts a required table.

(D4) Warehouse Management Database

A database for managing goods stocks stored in a warehouse, such as a logistics center, not shown.

(D5) Sales Management Database

An achievement management database relates to goods sold at each of the sales sites and stores.

In the goods purchase analysis assist system according to one embodiment of the present invention, at the store 10, the following actions and operations are performed (system operations, operations by customers and customer terminals are collectively listed). Note that in the goods purchase analysis assist system according to one embodiment of the present invention, not all these actions and processes are necessarily performed.

(1) Customer entry management into store and exit management from store (including personal identification and passing record of the customer; in a case without personal identification, the number of people is counted).

(2) Verification of goods taken from store shelves from customers, and returning of taken goods to the store shelves.

(3) Recognition process for goods in the shopping baskets (161 to 163 etc. in FIG. 1) that are designated by the store and are carried by customers.

(4) Settlement procedure process in and out of the store, and its management or its auxiliary process (including point refund process or the like).

[Role of Cameras 141 to 145]

Although the present invention is not limited thereto, the goods purchase analysis assist system according to one embodiment of the present invention can identify customers through the cameras 141 to 145, and recognize goods taken by the customers from the store shelves. In one embodiment, a recognition program and the like in this case are stored in a management server (described later), and are appropriately read and executed.

An existing object recognition process technique can be adopted for the recognition process in this case. Hereinafter, description is made with reference to FIG. 11.

Figure 11:
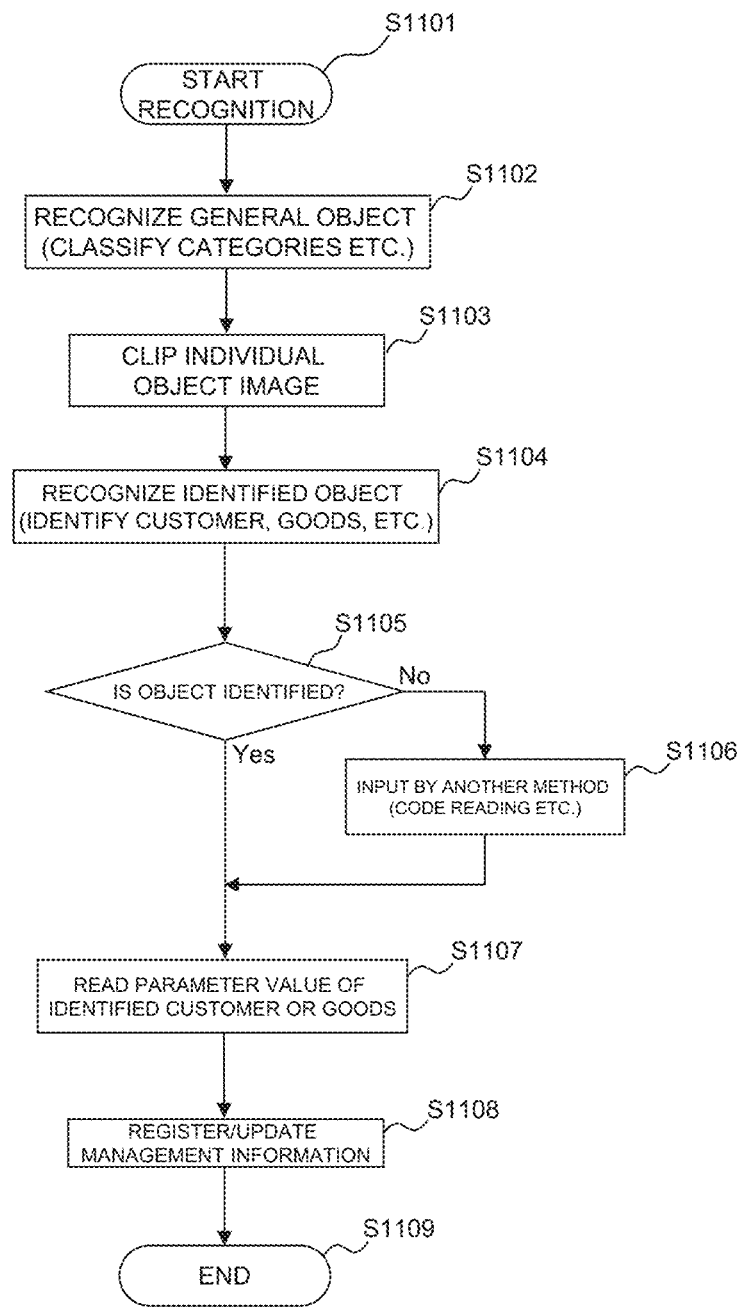
FIG. 11 illustrates a process flow in the goods purchase analysis assist system according to one embodiment of the present invention.

FIG. 11 shows a detailed process flow example including a flow in a case of identifying an object (a customer or goods) by an object recognition process, from still images or moving images taken by the cameras 141 to 145 installed in the store 10 and transmitted to the management server (described later). The object recognition process here can be achieved using a publicly known technique. Typical procedures, first, identifies the category of the object by a general object recognition process (a person or goods; in a case of a person, male or female; in a case of goods, the category of goods or the like), and subsequently proceeds identification of an individual object using auxiliary data and the like (in the case of a customer, identification of an individual; in the case of goods, identification of the name of goods or the like).

In FIG. 11, the processing is started in step S1101, then proceeds to step S1102, where, first, the general object recognition process for classifying the category and the like is performed. For example, the BOF (Bag-Of-Features) method can be adopted for the general object recognition process. The general object recognition process extends to recognition of the category of the detected object (a generic term of the object).

Next, in step S1103, a process of clipping an individual object image is performed. For example, provided that a situation where a customer is standing in front of store shelves and this customer is trying to obtain certain goods is taken in an imaging frame, objects such as "store shelves", "customer" and "goods (being taken)" are recognized in a stage of the general object recognition process, and "store shelves", "customer" and "goods" in the frame are clipped in this step (note that since what are required to be recognized in this flow are "customer" and "goods (being taken)", clipping is only required for images of "customer" and "goods (being taken)" in some cases). An identified object recognition process is performed for individual object images of the clipped "customer", "goods (being taken)" and the like (S1104).

The identified object recognition process in step S1104 can use not only images of single objects, a face of a person, etc., but also multiple layers of design data, such as CAD data on a goods structure (these data items are stored in the database of the management server). The characteristic points and characteristic amounts obtained from such images and design data are compared with characteristic amount data generated from the scanned image (not only still images but possibly moving images), and an identified object is recognized. Here, as methods of generating and comparing characteristic amount data, the roughly classified two types of following methods are known.

A first method generates images obtained by mapping on a two-dimensional plane at every angle on the basis of three-dimensional information for each minimum unit (represented by design data, etc.) constituting an object, such as goods, and generates the characteristic amount used to identify a target object from the mapped images. For example, the outline extraction method, SIFT method, SURF method and the like are adopted for the generation of the characteristic amount here. The comparison process extracts the characteristic amounts from the input image on the basis of the characteristic amounts, and compares appearance sites and frequencies.

A second method achieves determination by adopting, as an evaluation function, a process of mapping, on a two-dimensional plane, three-dimensional shape information made up of a set of minimum units (design data etc.) constituting objects, such as goods, while changing the projection angle, the magnification factor and the like, and adopting the difference in characteristic points and characteristic amounts of objects, as the degree of coincidence.

If the object is identified using the aforementioned publicly known method (Yes in step S1105), the processing proceeds to step S1107. If not (No in step S1105), processing proceeds to step S1106, where in the case of goods, an input process by another method, such as reading another code (goods code, etc.), can be performed.

In step S1107, a parameter value (data itself representing the identified customer or goods) corresponding to the identified customer or goods is read from the database of the management server (described later).

Next, the processing proceeds to step S1108, where the read parameter values is associated with the status of the customer or goods. Accordingly, for example, information as management information on the customer and the goods presently taken by the customer can be recorded/updated. The processing of this flow is finished (step S1109).

Although the description of this flow finishes in step S1109, it is a matter of course that such a recognition process is continuously performed during operation of the system. Situation management information in the store is successively updated; this information is about a certain customer taking other goods and storing in a basket, and about goods in a shopping basket of another customer at the current time.

[Functions of User Terminals 171 to 173]

In one embodiment of the present invention, after an application is installed in a user terminal as described later, a cooperative operation between the application program and the management server and the like allows the customer (user) to settle goods through the user terminal irrespective of whether being in or out of the store.

Figure 2:
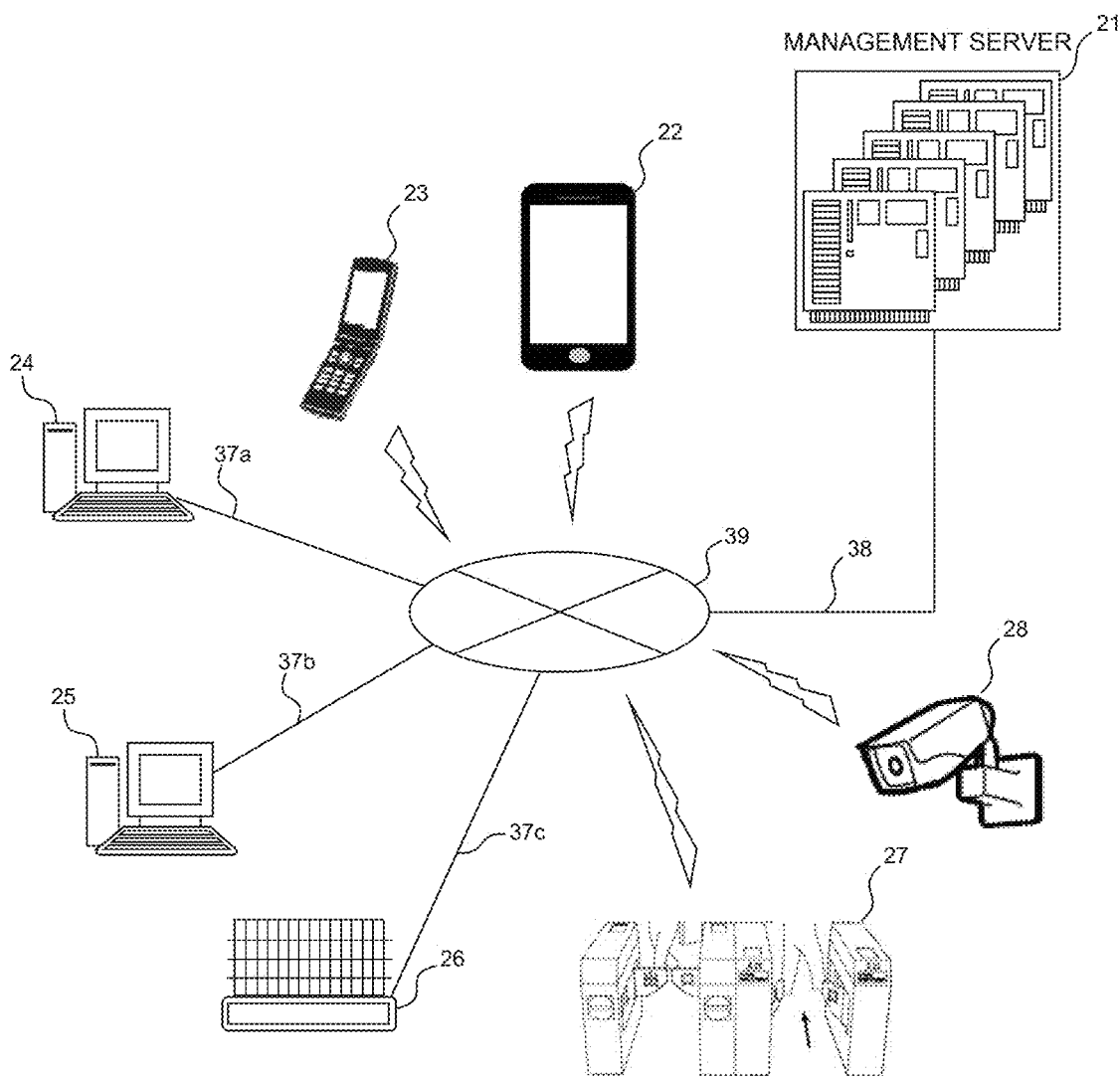
FIG. 2 illustrates an overall configuration example of the goods purchase analysis assist system according to one embodiment of the present invention.

FIG. 2 illustrates an overall configuration example of the goods purchase analysis assist system according to one embodiment of the present invention.

As shown in FIG. 2, a goods purchase analysis assist system 20 has a configuration according to one embodiment that includes: a management server 21; various information processing devices that the user (customer), and a store staff member a deliverer or the like as required use (in the diagram, for example, a mobile information terminal or a tablet terminal 22, a mobile phone 23, and PC24 to 25; hereinafter, sometimes collectively called "various terminals" or simply called "terminals"). The management server 21 and the various terminals are communicably connected to each other through a public line, such as a dedicated line or the Internet (reference numerals 37a to 39 as wired lines), as shown in FIG. 2. The line may be any of wired or wireless one. In the wireless case, the mobile information terminal or the tablet terminal 22, and the mobile phone 23 wirelessly access the Internet 39 via a base station, an access point and the like, not shown, and are further connected communicably to the management server 21 via a line 38.

Here, the access point is a wireless machine for connecting wireless terminals, such as PCs and smartphones, to each other, and for allowing these terminals to be connected to another network. Typically, the access point is a device operating according to the communication protocols of the first layer (physical layer) and the second layer (datalink layer) of the OSI reference model.

Note that mobile phones, mobile information terminals or tablets at the time of application of the present application often have a processing capability (the communication processing rate, the image processing capability, etc.) equivalent to that of a personal computer (PC), and are to be called small-sized computers.

The program or software required to implement the present invention is typically installed or stored in an HDD, SSD or the like of a storage of the PC or the mobile information terminal. When the program or software is executed, the program or software is entirely or partially read as a software module on a memory in the storage as required, and the module is computed and executed by a CPU.

Alternatively, a browser-based computer or a mobile information terminal may be adopted. In this case, a configuration is adopted where the program is distributed to the terminal from another server or computer as required, and the program is executed on a browser on the terminal.

The hardware configuration of the management server 21 can basically adopt a PC (for confirmation, description is made later with reference to FIG. 3). Although the present invention is not limited thereto, the management server 21 can adopt a configuration suitable for large-scale data processing, by operating multiple PCs (for example, several tens to several tens of thousand) in parallel, to improve the hardware specifications as required.

On the other hand, according to a certain system configuration, some (e.g., terminals 24 and 25 in a case of store terminals) of the information processing terminals described above can serve a part of or entire function of the management server 21.

Furthermore, as described with reference to FIG. 1, the goods purchase analysis assist system 20 includes store shelves 26, an entry and exit management gate 27 and a camera 28 for monitoring the store, which are installed in the store. In FIG. 2, in one embodiment, store shelves that are connected to a network via a line 37c and support the network are assumed as the store shelves 26. However, the present invention is not limited thereto. The store shelves 26 are not necessarily required to be connected to the network. The store shelves 26 is not necessarily electronic control shelves.

Furthermore, pluralities of store shelves 26, gates 27, and cameras 28 may be installed in the same store (FIG. 1 shows situations where pluralities of store shelves, gates and cameras are installed).

Figure 3:
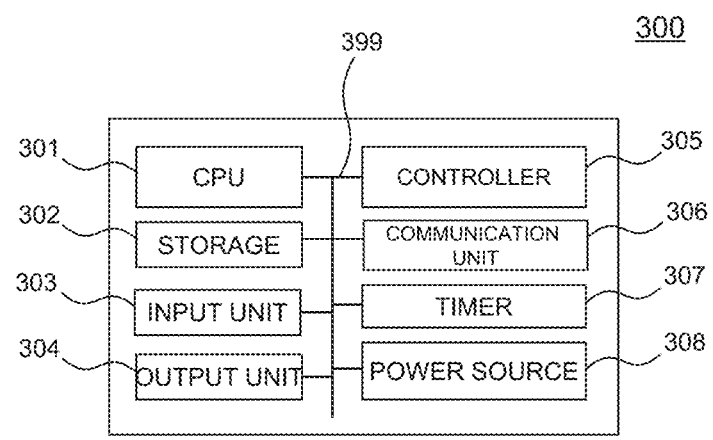
FIG. 3 illustrates a functional block configuration of a management server in the goods purchase analysis assist system according to one embodiment of the present invention.

FIG. 3 shows a functional block diagram of the management server 21 in the goods purchase analysis assist system according to one embodiment of the present invention. For example, the operation of the management server is achieved by individual operations of hardware, and by a cooperative operation between the software and hardware described below.

In FIG. 3, a management server 300 constituting the entire hardware block includes, in a roughly classified view: a CPU 301 for performing various comparison and computation processes; a storage 302, such as a RAM, a ROM and a flash memory; an input unit 303, such as a keyboard and a pointing device; an output unit 304, such as a display and a speaker; a controller 305 for controlling various signals; a communication (interface) unit 306 (irrespective of whether the scheme is wireless or wired); a timer 307 for measuring a time and the like; and a power source 308.

These modules are appropriately connected to each other by a communication bus and power supply lines (in FIG. 3, the lines are collectively represented as an appropriately segmented connection line 399, for convenience sake) as required.

The program or software that is executed on the management server 300 and is required to implement the present invention is typically installed or stored in an HDD (Hard Disc Drive), an SSD (Solid State Drive), a flash memory, etc. constituting the storage 302. When the program or software is executed, the program or software is entirely or partially read as a software module on the memory in the storage 302 as required, and the module is computed and executed by a CPU 301.

Note that execution of computation is not necessarily required to be performed in a central processing unit, such as the CPU 301. Alternatively, an auxiliary processing device, such as a digital signal processor (DSP), not shown, may be used.

Figure 4A:
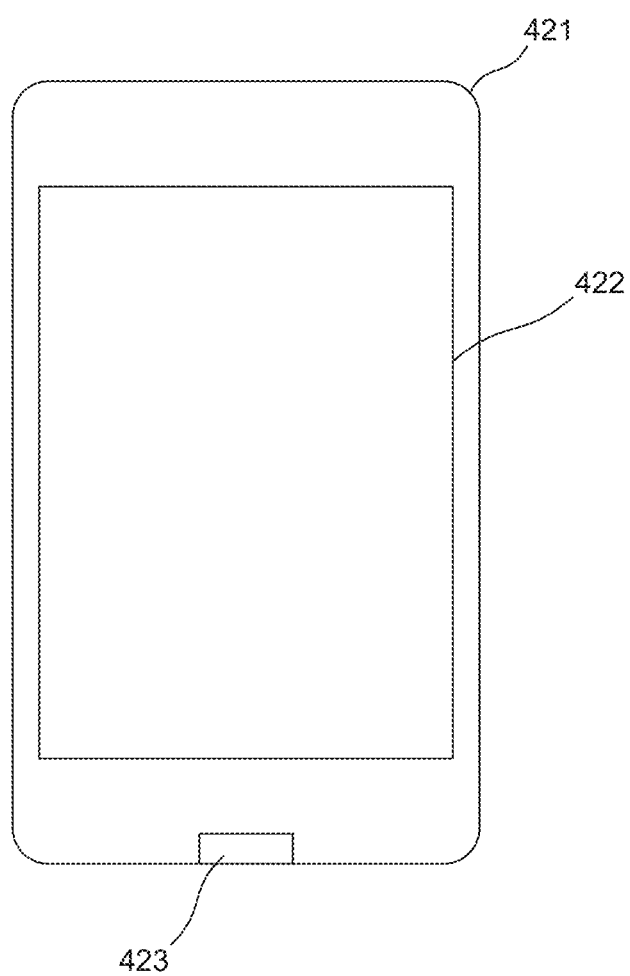
FIG. 4A illustrates an appearance configuration example of an information processing device (user terminal) in the goods purchase analysis assist system according to one embodiment of the present invention.

FIG. 4A illustrates an appearance configuration of the tablet terminal 22 as an information processing device in the goods purchase analysis assist system according to one embodiment of the present invention. In FIG. 4A, the information processing device (tablet terminal) 42 includes a casing 421, a display 422, and a hardware button 423 provided at the lower center of the casing 421. Typically, the display 422 is made up of a liquid crystal display (LCD) or the like, and can display various pieces of information, such as characters, still images, and moving images. Furthermore, a menu button and a software keyboard are displayed on the display 422, and are touched by a finger, a stylus pen (not shown) or the like, thereby allowing an instruction (command) to be issued to a tablet terminal 42. In this view, the hardware button 423 is not a necessary configuration element. However, for the sake of convenience of describing the present invention, this button is implemented as a button serving a certain function. It is a matter of course that the hardware button 423 may be replaced with a menu button displayed on a part of the display 422.

The display 422 further includes a multi-touch input panel. Touch-input position coordinates on the touch input panel are transmitted to the processing system (CPU) of the tablet terminal 42 via an input device interface (not shown), and are processed therein. The multi-touch input panel is configured such that multiple contact points onto the panel can be detected at the same time. The detection (sensor) is achieved by any of various methods. The sensor is not limited to a contact sensor. For example, an optical sensor can be used to extract an instruction point onto the panel. Further alternatively, the sensor may not only be the contact sensor or the optical sensor, but also a capacitive sensor that detects contact with human skin.

Although not represented in FIG. 4A, the tablet terminal 42 may include a microphone and a speaker. In this case, a voice of the user collected through the microphone is determined and used as an input command. Furthermore, although not represented in FIG. 4A, a camera device, such as of CMOS, may be implemented on the back of the tablet terminal 42.

Figure 4B:
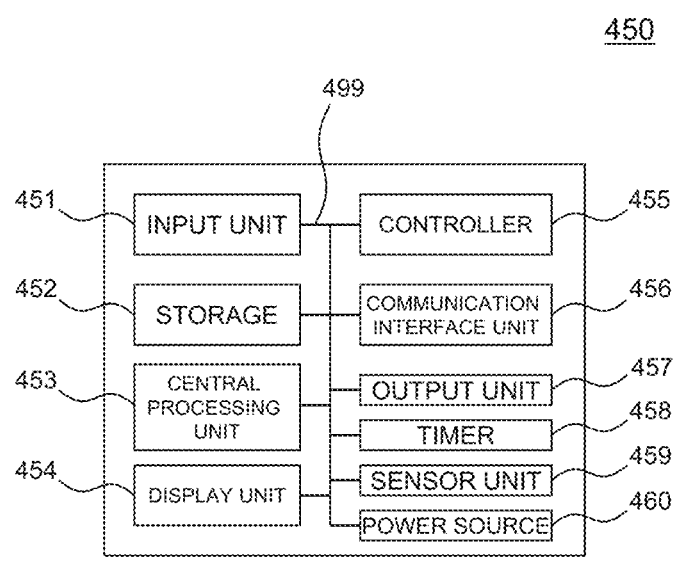
FIG. 4B illustrates a functional block configuration of hardware constituting the information processing device (user terminal) according to one embodiment of the present invention.

FIG. 4B exemplifies a functional block diagram of hardware constituting the tablet terminal 42 according to one embodiment of the present invention. The operation of the tablet terminal 42 is achieved by individual operations of hardware, and by a cooperative operation between the software and hardware described below.

In FIG. 4B, the tablet terminal 450 constituting the entire hardware block includes, in a roughly classified view: an input unit 451 that includes the hardware button 423 shown in FIG. 4A, the multi-touch input panel provided for the display 422, the microphone and the like; a storage 452 that includes a hard disk, an RAM and/or ROM for storing programs and data; a central processing unit 453 made up of a CPU that performing various numerical calculations and logical operations; a display unit 454 made up of the display 422 and the like; a controller 455 for controlling a chip, electric system and the like; a computation interface unit 456 that includes, a slot for accessing the Internet, ports for performing optical communication, and a communication interface; an output unit 457 that includes a speaker, a vibrator, an infrared projector and the like; a timer 458 for measuring the time and the like; a sensor unit 459 that includes an image sensor, such as CMOS, an infrared sensor, an inertial sensor and the like; and a power source 460 for supplying power for each of modules in the device. These modules are appropriately connected by a communication bus and a power supply line, as required (in FIG. 5, lines are collectively represented as a connection line 499, for convenience sake).

Note that the sensor unit 459 may include a GPS sensor module for identifying the position of the tablet terminal 450 (22). A signal detected by an image sensor, such as CMOS, an infrared sensor and the like, which constitute the sensor unit 459, is processed as input information in the input unit 451.

The program or software that is executed on the tablet terminal 450 and is required to implement the present invention is typically installed or stored in an HDD (Hard Disc Drive), an SSD (Solid State Drive), a flash memory, etc. constituting the storage 452. When the program or software is executed, the program or software is entirely or partially read as a software module on the memory in the storage 452 as required, and the module is computed and executed by a CPU 453.

Note that execution of computation is not necessarily required to be performed in the central processing unit 453, such as the CPU. Alternatively, an auxiliary processing device, such as a digital signal processor (DSP), not shown, may be used.

Figure 5A:
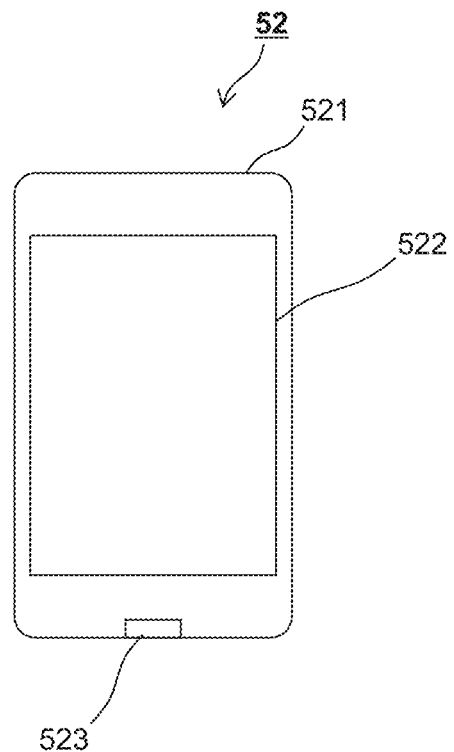
FIG. 5A exemplarily illustrates belongings of a customer in the goods purchase analysis assist system according to one embodiment of the present invention.
Figure 5B:
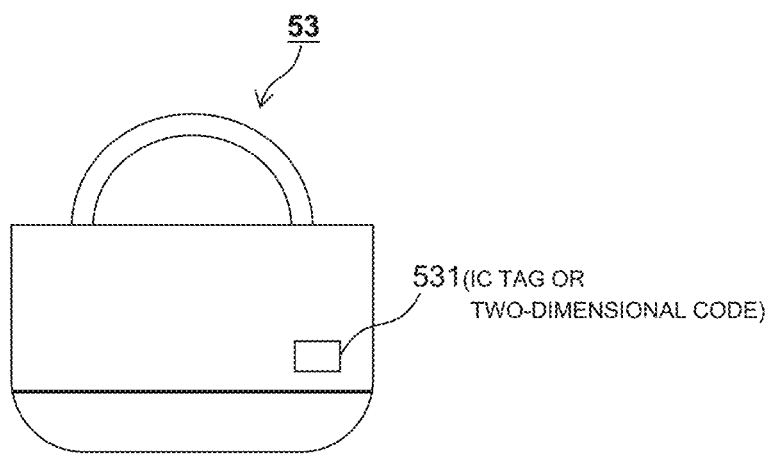
FIG. 5B exemplarily illustrates belongings of the customer in the goods purchase analysis assist system according to one embodiment of the present invention.

FIGS. 5A and 5B exemplify an object example carried by the customer in the goods purchase analysis assist system according to one embodiment of the present invention.

FIG. 5A shows the user terminal (customer terminal) 52 having already been described. Reference numerals 521, 522 and 523 in FIG. 5A correspond to reference numerals 421, 422 and 423, respectively. Accordingly, detailed description thereof is omitted.

FIG. 5B shows an appearance configuration example of a shopping basket (161 etc.). In one embodiment of the present invention, (1) the customer passes through the entry and exit gates 110, 120a and 120b, carrying the customer terminal (during passage, waves the terminal over the gate to perform a process, such as authentication), (2) carries the shopping basket together with the customer terminal and performs shopping in the store 10, and alternatively, (3) may perform shopping in the store 10 with no customer terminal being carried and with the shopping basket being carried.

In the case of the aforementioned (3), the customer carries what looks like an accessory with an IC tag or a two-dimensional code, not shown, being pasted thereon, and passes through the entry and exit gates 110, 120a and 120b. As required, during passage, a process, such as authentication, may be performed by waving the IC tag or the two-dimensional code over the gate.

As shown in FIG. 5B, the IC tag or the two-dimensional code 531 is attached to a predetermined position on the shopping basket 53 (or any position in the shopping basket 53 can be allowed), and shopping is performed in the store 10. During settlement, the customer can be identified by reading the IC tag or the two-dimensional code 531, and a settlement process can be performed.

In the case of the aforementioned (3), according to one embodiment of the present invention, the shopping basket is provided when the customer passes through the entry gate (may be provided immediately before or immediately after passage), and the IC tag or the two-dimensional code is attached as required, and is returned after shopping is finished when passing through the exit gate (may be returned immediately before or immediately after passing).

Alternatively, in the aforementioned (2) case, according to one embodiment of the present invention, the IC tag or the two-dimensional code may be left attached to the shopping basket. When the shopping basket is passed to the customer, this customer reads the IC tag or the two-dimensional code by the own terminal, thereby achieving transmission to the management server 21, associating the customer with the shopping basket in the management server 21, and managing or monitoring shopping situations of the customer who is shopping in the store 10. In this case, only by reading the IC tag or the two-dimensional code 531 attached to the shopping basket 53 during settlement, the customer intending to perform settlement can be identified (in a case where goods that are the contents of the shopping basket have already been recognized, real-time settlement can be made; in other cases, the goods may be taken out of the shopping basket, and settlement by the customer may be made by causing a reader, not shown, to perform reading).

Figure 6:
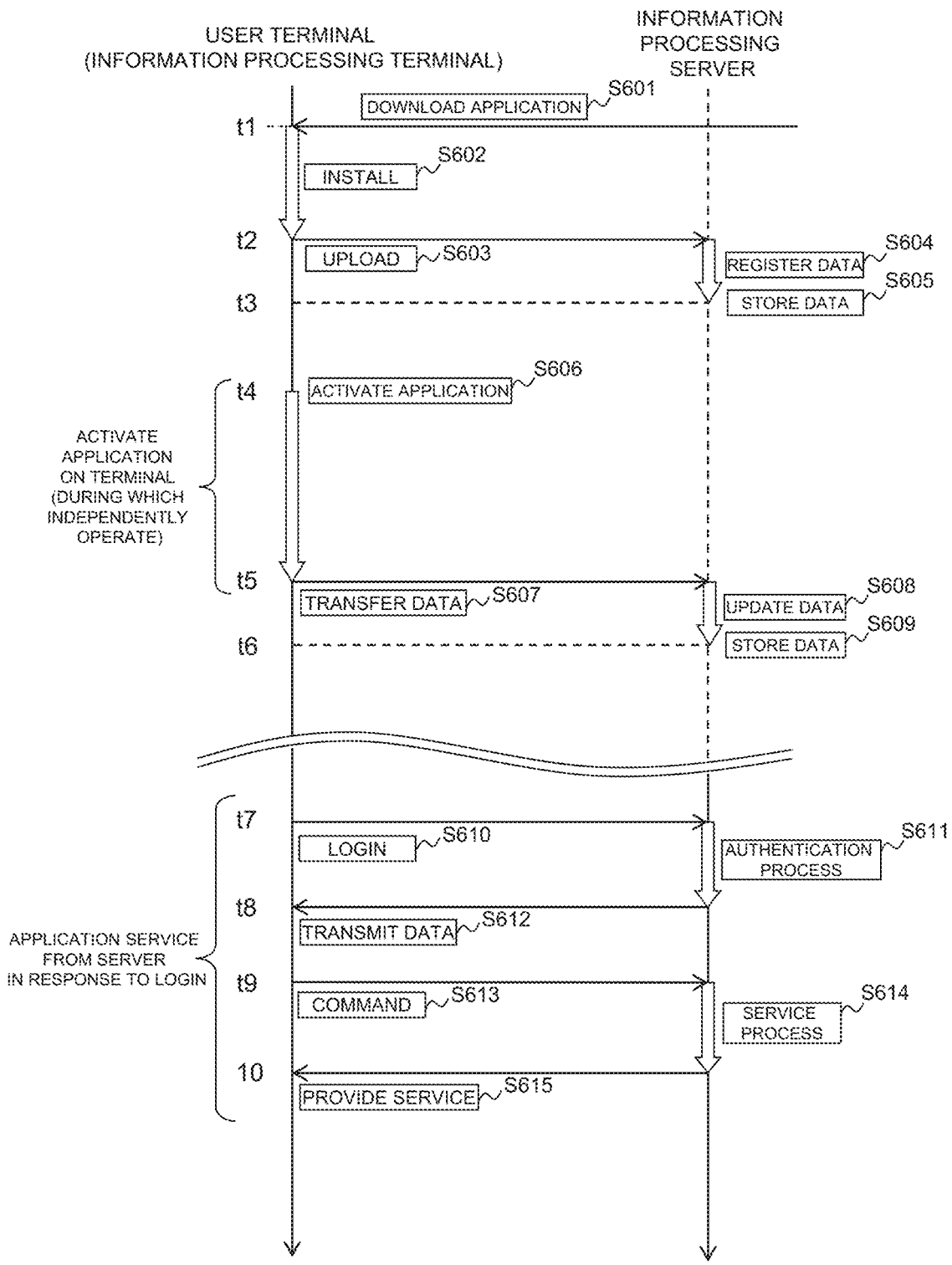
FIG. 6 illustrates a basic flow of operation processes in the goods purchase analysis assist system according to one embodiment of the present invention.

FIG. 6 shows a basic operation example in the system, device or the like according to one embodiment of the present invention exemplified in FIGS. 1 and 2.

In FIG. 6, "user terminal" corresponds to the terminals 171 to 173 in FIG. 1, the terminal 22 in FIG. 2 and the like. "Information processing server" corresponds to the management server 21 in FIG. 2. In FIG. 6, t1 to t10 indicate a time-series flow, and after-mentioned operations and processes are temporally performed.

Note that the operation or the processing time (t1 etc.) exemplified in the embodiment is exemplified for facilitating understanding of the concept of the present invention. The present invention is not limited to the individual time-series relationship exemplified in the embodiment.

First, at the date and time t1, the user (customer) downloads application software for causing the own user terminal to operate as the information processing terminal according to the present invention, from the information processing server through the user terminal (step S601). The application software is client software or application software for processing a part of or the entire program according to the present invention. The downloaded application software is installed in the user terminal (step S602). In this case, at time t2, as required, besides an email address of the user themselves, profile information such as in the following table may be uploaded, as user registration, from the user terminal to the information processing server (step S603), and registered and managed (step S604).

TABLE 1

| Name (User name) | Membership number (ID) | E-mail address (Mobile phone number) | Gender | Age (Age range) | Resident area (Area, etc.) |
| --- | --- | --- | --- | --- | --- |

The above data items are stored, as user data, in a storage device of the information processing server (step S605). On and after time t3, the user (customer) can start the application (the server can start to provide services for the terminal) by the user's operating the information processing terminal.

Next, the user having downloaded and installed the application in the user terminal activates the application software at time t4 (step S606). From time t4 to time t5, for example, the user is provided with services provided from the information processing server for the information processing terminal.

At time t5, the user temporarily stops or finishes the application software according to one embodiment of the present invention. At this time, as required, status information on the application is transferred to the information processing server (step S607), and the server receives the information and updates (step S608) and stores (step S609) the status information as user information on the user. In FIG. 6, these processes are completed by time t6.

Note that a mode can be adopted where after the application software according to one embodiment of the present invention is installed in the information processing terminal, at least a part thereof can be executed in the terminal in a closed manner. In this case, steps S604 to S605 and steps S608 to S609 described above can be omitted. If there is required information, the information is stored and managed on the memory in the terminal.

Next, in FIG. 6, from time t7 to time t10, there is indicated an embodiment example where the information processing server executes at least a part of the application software according to one embodiment of the present invention. In this case, the user (customer) performs two typical user terminal operations that are a login operation, and command transmission, and receives required data transmitted from the information processing server, or is provided with services.

For example, at time t7 in FIG. 6, the user performs the login process to the server through their own information processing terminal (step S610), and the information processing server appropriately performs a required authentication process (step S611) and, at time t8, transmits data for allowing the user to be provided with services (step S612). For example, a top menu screen, an application activation screen or the like that is configured to allow a command from the terminal to be received, are assumed.

At time t9, the user transmits a certain command through the information processing terminal (step S613). The command may be selection of the menu displayed on the menu screen. In the case of the application activation screen, the command is sometimes a start command for starting the application. The server receives the command, and starts the service process (step S614). At time t10, the service responding to the request of the terminal is provided from the server for the terminal (step S615).

Although not shown in FIG. 6, also on and after time t10, a command can be transmitted from the terminal as needed (for example, a message transmission command, a menu selection command, etc.), and the server can provide the service in response to receipt of the command from the terminal accordingly (for example, transfer of the received message to another terminal, and message analysis is performed and its result is replied).

Figure 7A:
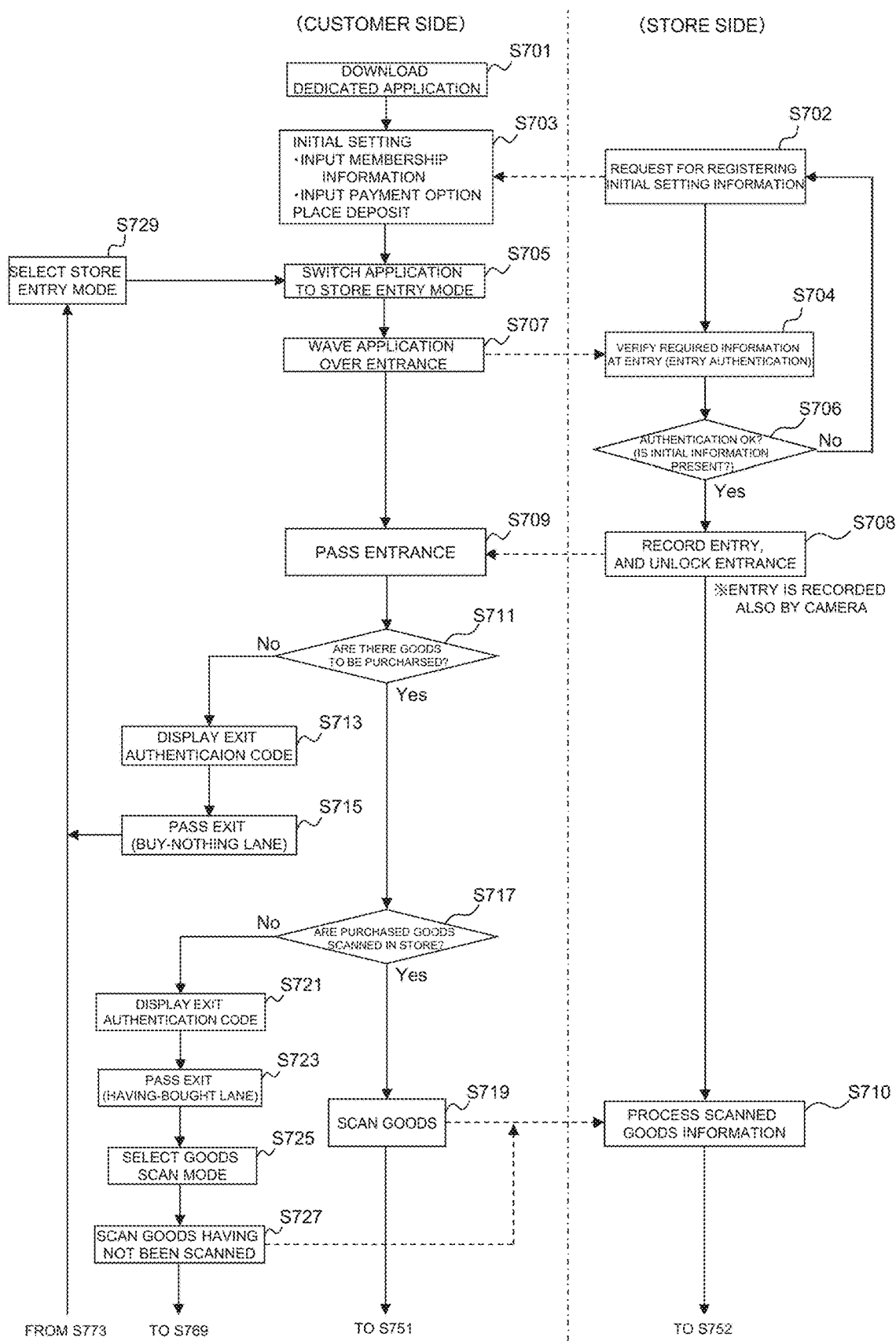
FIG. 7A illustrates a flow of operations and a system process flow in the goods purchase analysis assist system according to one embodiment of the present invention.
Figure 7B:
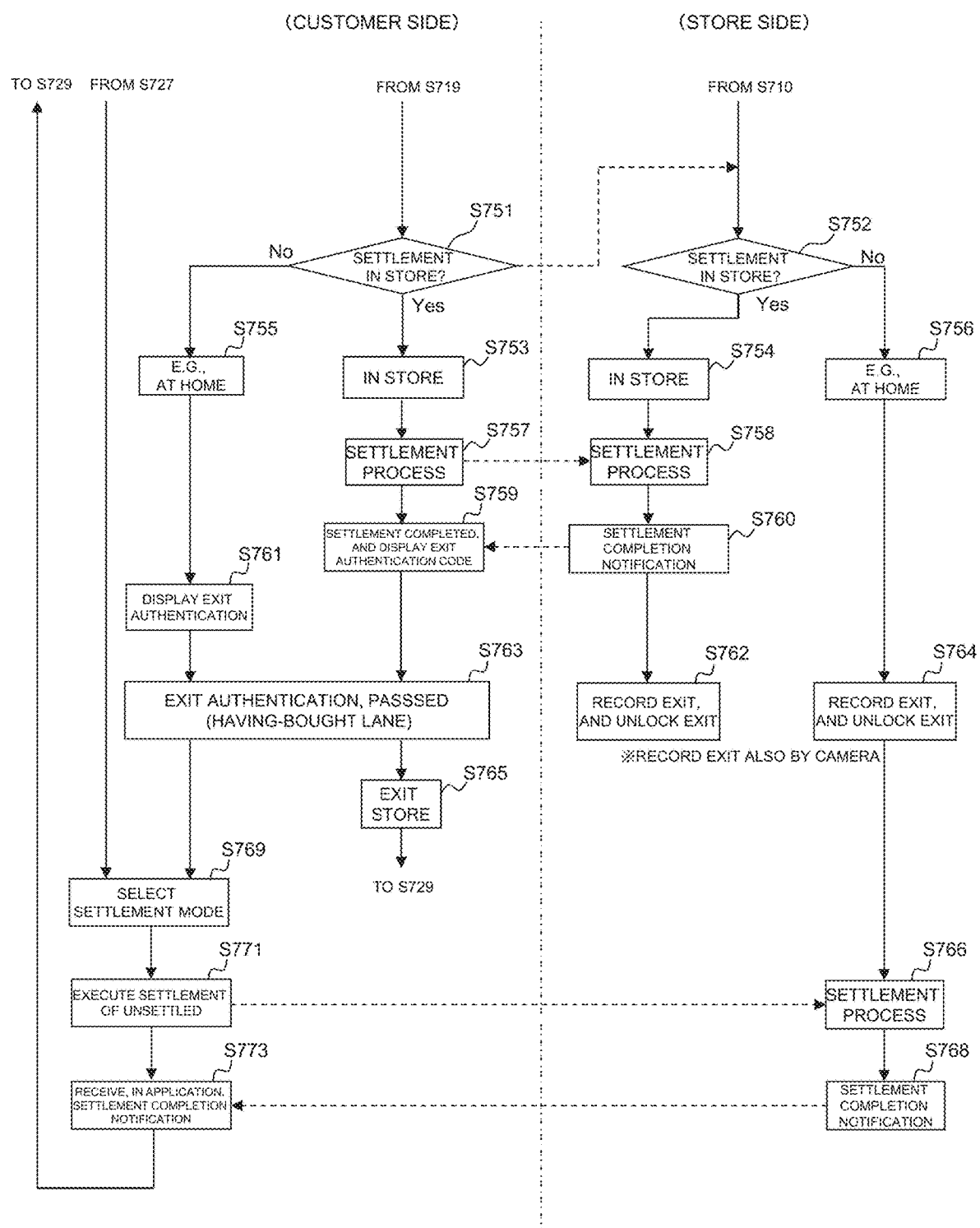
FIG. 7B illustrates the flow of operations and the system process flow in the goods purchase analysis assist system according to one embodiment of the present invention.

FIGS. 7A and 7B show an operation process flow in the goods purchase analysis assist system according to one embodiment of the present invention. Here, the flow of operations and processes are roughly classified into operations and processes of a customer (user) who owns the customer terminal (user terminal), and store-side processing operations for, based on the control by the management server, recognizing customers or goods, performing settlement processes or transmitting various notifications, and are described.

In step S701, the user (customer; hereinafter the same applies) downloads a dedicated application to the own terminal. This mode encompasses various variations as described with reference to FIG. 6. Download of the dedicated application is not necessarily an indispensable condition.

In step S702, the management server on the store side or the like prompts the user terminal to input and set initial setting information and the like (for example, a guidance screen or the like is displayed on the user terminal). In step S703, as an operation after activation of the application, membership information and the like is input into the terminal by the user (the specific example has been described with reference to FIG. 6).

According to one embodiment of the present invention, in step S703, besides the input of the membership information, input of a payment option is allowed (changeable even after the initial setting, as needed). In this step, a deposit placement process can be performed. The deposit serves as a debit source of a payment during a settlement process in one embodiment of the present invention.

(Further Handling of Deposit)

Note that the deposit placement process is executed at any timing except the initial setting. However, control can be made such that entry is denied without any deposit (in this case, entry is denied by an error display at the gate entrance described later). Furthermore, the deposit may be electronic money dedicated for the store (any of setting of being common to affiliated shops, and setting of being dedicated to the store can be configured), or medium record information for electronic settlement.

In one embodiment of the present invention, the deposit placement process may be adopted as a condition for entry into the store.

Next, the processing proceeds to step S705, the user switches the own terminal to "store entry mode" in order to enter the store according to one embodiment of the present invention. The present invention is not limited thereto. However, in one embodiment of the present invention, the application on the user terminal can be switched between (1) a store entry mode, (2) a goods scan mode, (3) a goods settlement mode, and (4) a store exit mode, in a roughly classified view. The terminal application is used with the mode being switched in conformity with the scene.

In one embodiment, on the screen of the terminal application switched to the store entry mode, an authentication code, not shown, for entering the store is displayed (an information code, such as a two-dimensional code, to be waved over the gate entrance; hereinafter, also called an entry authentication code).

Next, in step S707, the customer waves the entry authentication code displayed on the terminal, over the entrance of the gate 110. In one embodiment of the present invention, the code is optically read at the gate 110 and transmitted to the management server 21 or the store-side terminal, not shown, and an authentication process for the customer themselves is performed (step S704). Alternatively, in step S704, required information for entry may be verified.

Next, the processing proceeds to step S706, and it is determined whether the authentication is affirmative (or whether initial information on the customer has already been registered or not).

Here, if No in step S706, the processing returns to step S702, and the user terminal may be caused to request the user terminal to register the initial setting information and the like at this time. If Yes in step S706, the processing proceeds to step S708, and the entrance of the gate 110 is opened (for example, a check door is opened). At this time, the management server 21 records the customer's passing through the entrance (entry). According to one embodiment of the present invention, the record at the time of entry is executed also by identity authentication through the camera or the like.

In step S709, the customer passes through the entrance of the gate 110.

Figure 10:
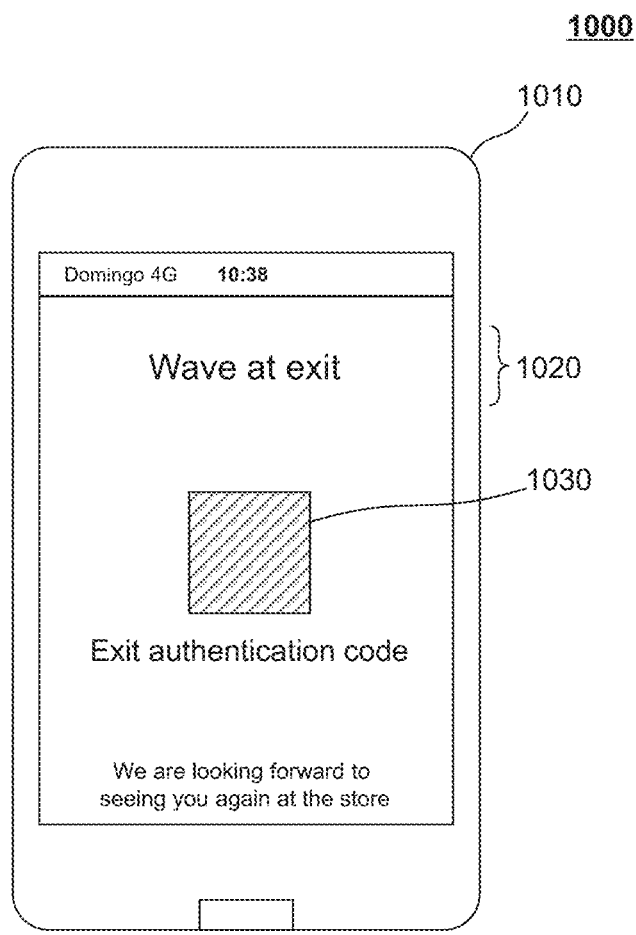
FIG. 10 illustrates yet another display example of the information processing device (the user or the customer terminal) in the goods purchase analysis assist system according to one embodiment of the present invention.

Next, the processing proceeds to step S711, where the processing operations are different dependent on whether there are goods that the customer wishes to purchase. In step S711, if there are goods that the customer wishes to purchase (Yes), the processing proceeds to step S717, and if not (No), the processing proceeds to step S713. In step S713, the customer switches the own terminal to the store exit mode, and waves an exit authentication code (one mode of an exit code for leaving a receiving area and exiting the store) over the exit of the gate 120b. According to one embodiment of the present invention, the code is optically read at the gate 120b (also called "buy-nothing lane"), and is transmitted to the management server 21. A display example of the exit authentication code is shown in FIG. 10. FIG. 10 shows a screen example of a user terminal 1000. A guidance message 1020 and an exit authentication code 1030 are arranged on a display 1010 of the terminal 1000. A known two-dimensional code can be adopted as the exit authentication code 1030.

The processing then proceeds to step S715, and the exit of the gate 120b is opened (for example, a check door is opened). At this time, the customer's passing through the exit is recorded in the management server 21. According to one embodiment of the present invention, the record at the time of exit is executed also by identity authentication through the camera or the like.

In step S715, the customer passes through the exit of the gate 120b.

For facilitating understanding of the present invention, it is assumed that the entry authentication code and the exit authentication code are known two-dimensional codes, and the reading method is optical reading. However, the present invention is not limited thereto. Alternatively, an authentication method according to a magnetic reading method or a known near field wireless communication technique can be adopted (hereinafter, the same applies).

In step S717, the processing operations are different depending on whether the goods that the customer wishes to purchase are to be scanned in the store or not (in a specific example, they are in the shopping basket). If Yes in step S717, the processing proceeds to step S719. If No, the processing proceeds to step S721.

As for the characteristics of the present invention, presence/absence of scanning in the store is not the same as presence/absence of settlement in the store described below. They are independent processing operations.

According to one embodiment of the present invention, if Yes in step S717 (i.e., if goods are scanned in the store in the next steps S719 and S710), a flag of scanning in the store may be turned on in a table, not shown, in the management server or the like, thus allowing management thereof.

In step S721, the customer switches the own terminal to the store exit mode, and waves the exit authentication code over the exit gate 120a (also called a "having-bought (scheduled-to-be-bought) lane"). The code is read at the gate 120a, and is transmitted to the management server 21. The display example of the exit authentication code is as shown in FIG. 10. This is in the case of settlement out of the store. Accordingly, display of the message is "Check out later, please." or the like is made. The processing then proceeds to step S723, and the exit of the gate 120a is opened (for example, a check door is opened). At this time, the customer's passing through the exit is recorded in the management server 21. According to one embodiment of the present invention, the record at the time of exit is executed also by identity authentication through the camera or the like.

In step S725, the customer switches the own terminal to "goods scan mode", and the processing proceeds to step S727, where goods having not been scanned are scanned. The scanning here is processes of reading or recognizing goods information for identifying the goods. In one embodiment, besides reading of goods tags and reading of goods codes printed on packages of goods, an object recognition process described with reference to FIG. 11 can also achieve scanning.

Figure 8:
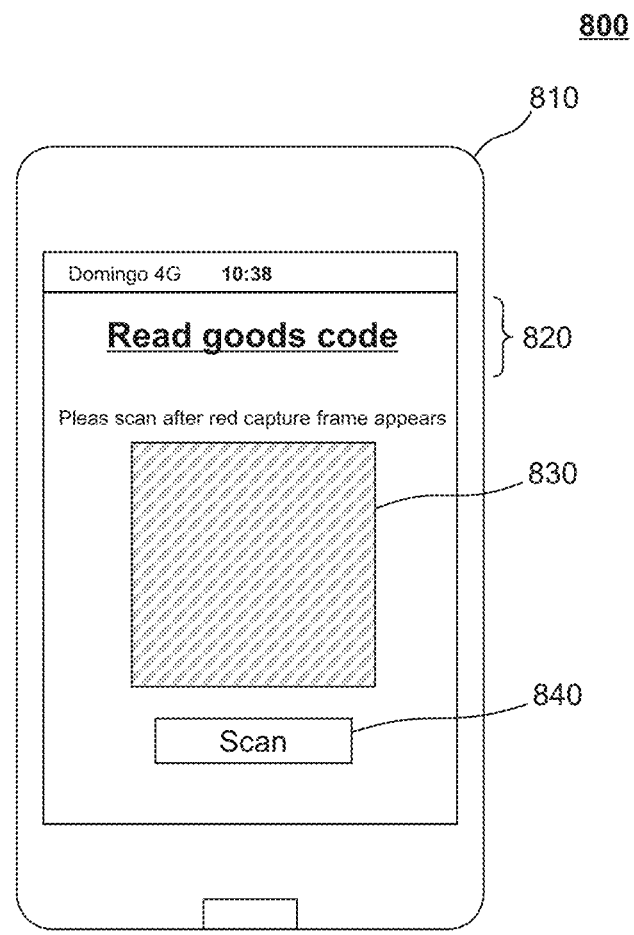
FIG. 8 illustrates a display example of the information processing device (the user or the customer terminal) in the goods purchase analysis assist system according to one embodiment of the present invention.

FIG. 8 shows a screen example of the user terminal in a case where goods tags are read or goods code printed on packages of goods are read, FIG. 8 shows a screen example of the user terminal 800. A guidance message 820, an image frame 830 for capturing an image, such as a goods code, and a scan execution button 840 are arranged on a display 810 of a terminal 800. The user images the goods code printed on the package or the like of the goods by the camera of the terminal so as to fit the code within the image frame 830, and captures the goods code by a capturing function, not shown (at this time, in one embodiment, a red frame can be displayed on the edge of the captured goods code), and then the user presses the scan execution button 840 to perform the reading process.

Note that also in a case where the object recognition process described with reference to FIG. 11 is performed, it is a matter of course that a similar interface can be adopted to execute the recognition process.

The goods information scanned by the aforementioned procedures is recorded and managed by the management server or the like in step S710. After completion of step S727, the processing proceeds to step S769.

On the other hand, in step S719 (Yes in step S717), the scan process in the store is performed, and the scanned goods information is recorded and managed by the management server or the like in step S710.

FIG. 7B shows the processing operation flow subsequent to FIG. 7A. For further facilitating understanding of checkout/settlement process described later, the processes are described as processing operations cooperating between the customer side and the store side. That is, for example, steps S751 and S752 are not independently determined between the customer-side terminal and the store-side server but cooperate with each other (if Yes in step S751, also Yes in step S752; if No in step S751, also No in step S752). In another example, steps S753 and S754 cooperate with each other, and steps S755 and S756 cooperate with each other.

In step S751 (step S752), the processing operations are different depending on whether the customer wishes checkout in the store or not. If Yes in step S751 (step S752), the processing proceeds to step S753 (step S754). If No, the processing proceeds to step S755 (step S756).

Since in step S753 the settlement process is performed in the store, the user terminal is switched to the goods settlement mode (in step S754, preparation is made so as to allow a settlement process request to be accepted, as required). In step S757, the settlement process request is issued from the user terminal to the management server or the like. In step S758, the settlement process is performed by the management server or the like in response thereto. Subsequently, in step S760, a settlement completion notification is issued from the management server or the like. In step S759, the user terminal receives the settlement completion notification, and the exit authentication code is displayed on the terminal screen as required.

On the other hand, in step S755 (if No in step S751), the user determines home settlement (settlement out of the store). Accordingly, in one embodiment, a notification about settlement out of the store is transmitted to the management server or the like (in another embodiment, it is possible not to transmit). In step S756, this notification is received by the management server or the like, the originator user records the determination of settlement out of the store (in another embodiment, the operation can be made so as not to receive the notification about settlement out of the store).

If the notification about settlement out of the store is received and recorded in step S756, time measurement by timer means, not shown, may be started (to measure a time period after the user issues the notification about settlement out of the store).

The start of the time measurement is not limited to the case in step S755 or S756. Alternatively, the start may be in step S761, S763 or S764.

In step S761, the user terminal is switched to the store exit mode. For example, the screen exemplified with reference to FIG. 10 is displayed on the user terminal screen.

In step S763, the user having selected their checkout (settlement) method receives exit authentication at the gate 120a, and passes through the gate. In the corresponding steps S762 and S764, an exit record is made in the management server or the like. The gate 120a is unlocked (alternatively, the gate exit is opened). According to one embodiment of the present invention, the record at the time of exit can be executed also by identity authentication through the camera or the like.

In step S765 (if settlement in the store is finished), the series of shopping flow is finished. In a case of shopping in the store in one embodiment of the present invention again, the processing returns to step S729.

Step S769 is a case of settlement out of the store. The user switches the own terminal to the goods settlement mode, so as to achieve settlement of goods taken out of the store, at home, such as the outside of the store.

Figure 9:
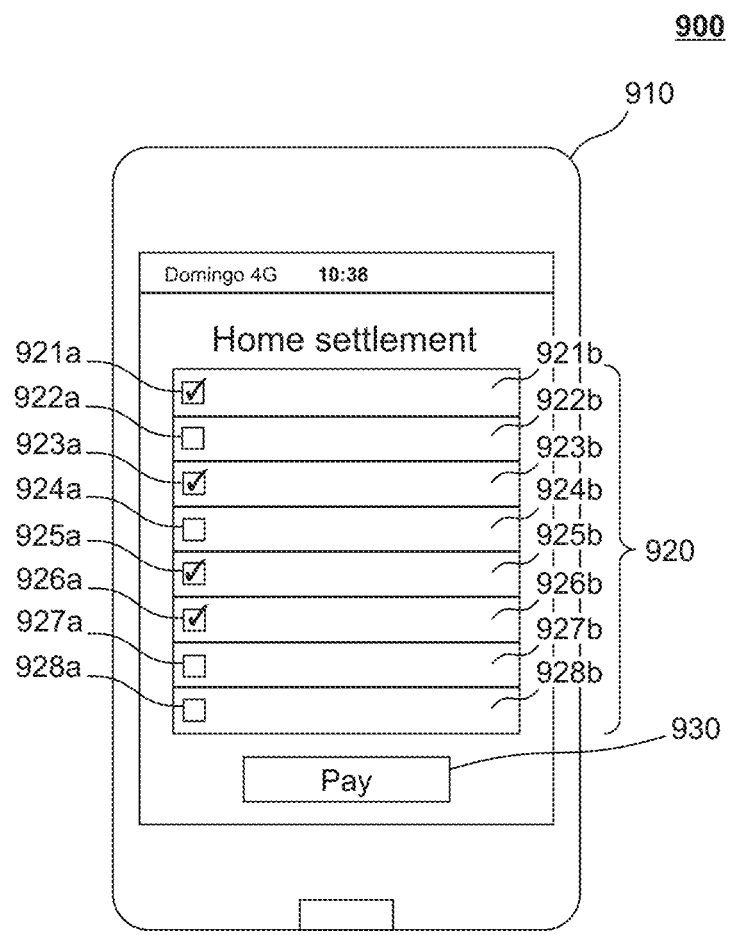
FIG. 9 illustrates another display example of the information processing device (the user or the customer terminal) in the goods purchase analysis assist system according to one embodiment of the present invention.

Next, the processing proceeds to step S771, and settlement of the unsettled is executed. The display example of the user terminal screen at settlement out of the store is as shown in FIG. 9. FIG. 9 shows a screen example of a user terminal 900. A title "Home settlement" (this is displayed as "Settlement out of store" or the like in another embodiment), indication and selection fields 920 of goods to be settled, and a settlement execution button 930 are arranged on a display 910 of a terminal 900.

Selection check boxes 921a to 928a, and corresponding goods indications 921b to 928b are displayed in the indication and selection fields 920 of goods. The user selects goods to be settled at the site among the goods to be settled (in this diagram, for example, reference numerals 921a, 923a, 925a and 926a are selected). When the settlement execution button 930 is pressed, transition is made to a settlement screen, not shown, for example, thus executing settlement.

According to one embodiment of the present invention, the settlement process is executed in the management server (step S766). After completion of the settlement process, the settlement completion notification is transmitted from the management server (step S768). The user terminal receives the notification (step S773).

The processes so far completes the series of shopping flow. In a case of shopping in one embodiment of the present invention again, the processing returns to step S729.

[Application of Goods Scanning]

The goods scanning described so far are mainly by the user terminal. However, the present invention is not limited thereto. Instead of goods scanning by the user terminal, or in parallel to goods scanning by the user terminal, scanning may be performed by the cameras installed in the store (reference numerals 141 to 145 in FIG. 1, and reference numeral 28 in FIG. 2). In this case, according to one embodiment of the present invention, when the customer (individually recognized) puts certain goods in the shopping basket by a hand, the goods are recognized as the goods to be settled by the management server or the like. If the customer then changes their mind and returns the goods in the shopping basket to the original store shelves (or return selves, not shown), update is made such that the goods are individually recognized and are removed from the list of the goods to be settled for the customer. These processes are performed substantially in real time.

[Operation by Customer Self-Report Basis]

According to another embodiment of the present invention, it can be self-reported by the customer (retrospective settlement out of the store) whether the goods are taken out of the store or not. Even in this case, monitoring by security cameras in the store is executed (identification of the taken goods is not necessarily required; also for individual recognition of the customer, automatic recognition by the system is not necessarily required only if determination can be achieved by the camera video), and customers having not reported or settled irrespective of the fact that the goods have obviously been taken out based on the entry and exit record of the terminal application and the security camera video, can be grasped.

According to another embodiment of the present invention, for the customers having not reported or settled, the processing can be performed so as to collect (forfeit) deposits (according to one embodiment, since control is performed such that customers having no deposit cannot enter the store, the amount from the deposit can be collected).

Furthermore, according to another embodiment of the present invention, for the customers having not reported or settled, control procedures can also be performed such that, first, the store issues a reminder (warning), and the deposits of customers who do not pay irrespective thereof are forfeited.

Note that the customers having not reported or settled can be added to an entrance denial target list, not shown, in the management server. The customers added to the entrance denial target list are managed by the management server. In case the customers tried to enter the store, entry is denied.

A system management control flow example in a case of execution of the "Operation by customer self-report basis" described above, is described below.

(S1) Although a customer takes out goods to the outside of the store, no report or settlement is performed even after lapse of a certain time period (for example, a predetermined time period, such as 6 hours, 12 hours, or 24 hours after exit) after exit of the customer. (To S2)

(S2) One or more reminder processes from the store to the customer terminal concerned are performed. A reminder process through an application onto the customer terminal is preferable for the reminder process concerned. However, the present invention is not limited thereto. For example, this can encompass not only reminders through email or another chat application, but also reminders through phone or the like.

(S3) Even after the aforementioned step (S2), no report or settlement from the customer is performed (or without a report and settlement). (To S4)

(S4) The deposit of the customer concerned is collected (forfeited). Alternatively, the deposit account can be frozen. (To S5)

(S5) The customer is added to the entrance denial target list. Furthermore, in case the customer concerned comes to the store, entry of this customer can be denied according to the entrance denial target list information.

Figure 7C:
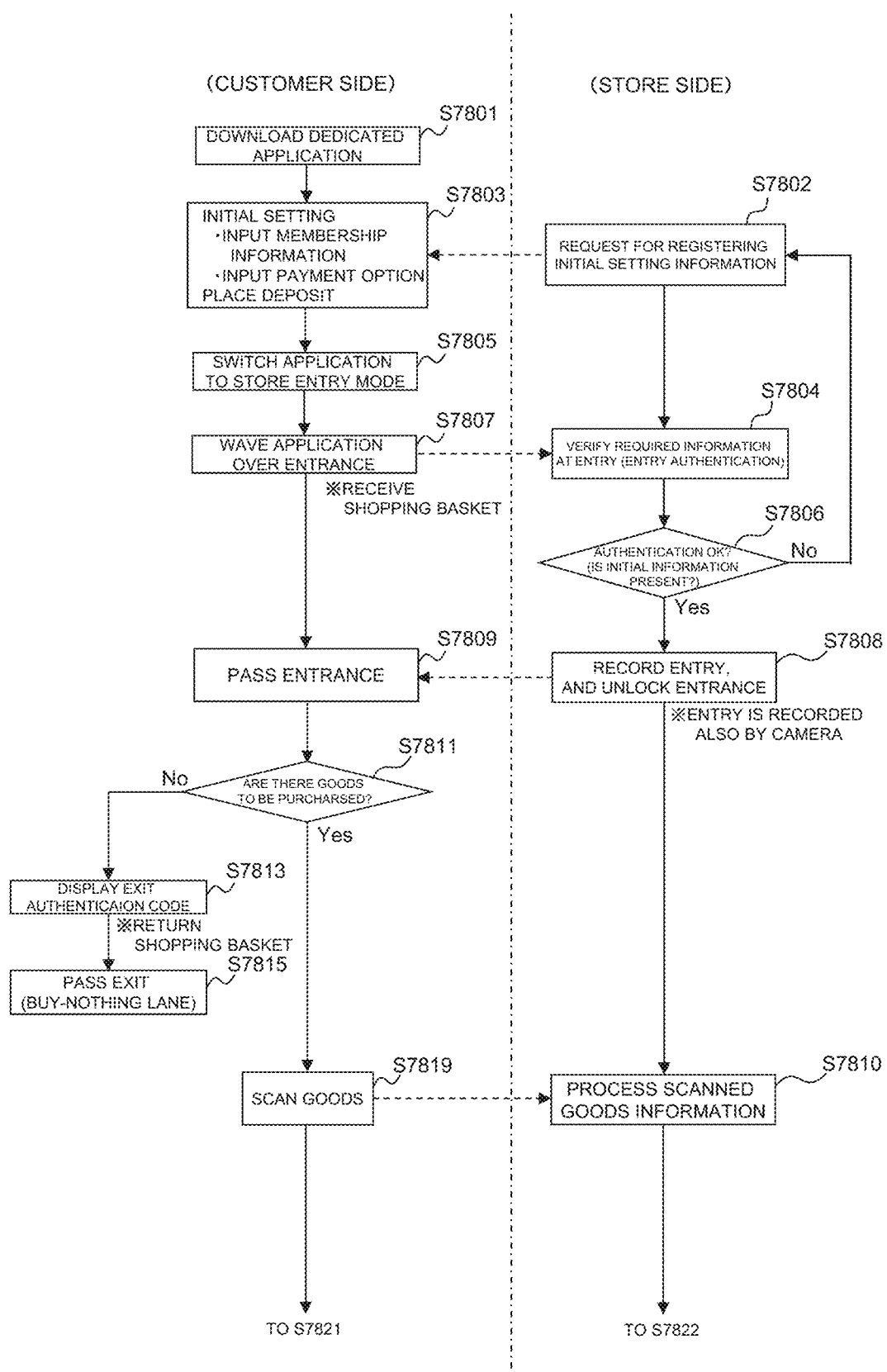
FIG. 7C illustrates the flow of operations and the system process flow in the goods purchase analysis assist system according to another embodiment of the present invention.
Figure 7D:
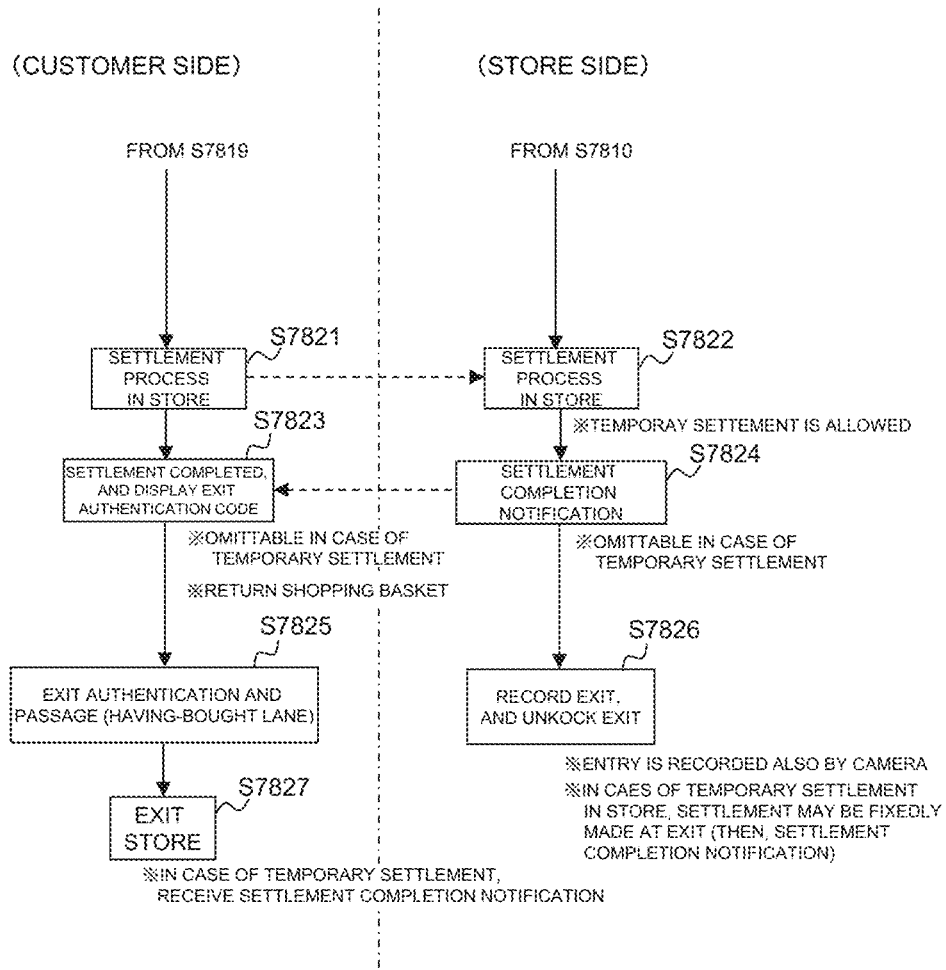
FIG. 7D illustrates the flow of operations and the system process flow in the goods purchase analysis assist system according to another embodiment of the present invention.

FIGS. 7C and 7D show an operation process flow in the goods purchase analysis assist system according to another embodiment of the present invention. The flow of operations and processes are roughly classified into operations and processes of a customer (user) who owns the customer terminal (user terminal), and store-side processing operations for, based on the control by the management server, recognizing customers or goods, performing settlement processes or transmitting various notifications, and are described.

The difference from the flow described with reference to FIGS. 7A and 7B is that the flows shown in FIGS. 7C and 7D do not necessarily require settlement through the user terminal, and assume shopping and settlement in the store similar to the following (S1) and (S2).

(S1) At entry and exit, authentication and the like through the user terminal is required. However, at settlement in the store, the settlement in the store is performed through the shopping basket (or the IC tag or the two-dimensional code attached thereto). Note that also in this case, settlement in the store through the user terminal or the like or settlement out of the store, as an option, is not excluded (hereinafter, for convenience sake, description of the option is omitted).

(S2) At entry and exit, authentication or the like by other means except the user terminal is required (for example, through a medium or the like to which the preliminarily provided IC card or two-dimensional code information are attached), and also at settlement in the store, the settlement in the store is performed through the shopping basket (or the IC tag or the two-dimensional code attached thereto).

Hereinafter, the operation process flow assuming the aforementioned (S1) or (S2) is described. However, hereinafter, the individual and specific flow does not limit the extension of the present invention. It is a matter of course that the elements described with reference to FIGS. 7A and 7B (for example, the settlement flow out of the store or the like) can be appropriately adopted.

In step S7801, the user (customer; hereinafter the same applies) downloads a dedicated application to the own terminal. This mode encompasses various variations as described with reference to FIG. 6. Download of the dedicated application is not necessarily an indispensable condition.

In step S7802, the management server on the store side or the like prompts the user terminal to input and set initial setting information and the like (for example, a guidance screen or the like is displayed on the user terminal). In step S7803, as an operation after activation of the application, membership information and the like is input into the terminal by the user (the specific example has been described with reference to FIG. 6).

According to one embodiment of the present invention, in step S7803, besides the input of the membership information, input of a payment option is allowed (changeable even after the initial setting, as needed). In this step, a deposit placement process can be performed. The deposit serves as a debit source of a payment during a settlement process in one embodiment of the present invention.

As handling related to the deposits, the handling similar to that of the implementation example described with reference to FIGS. 7A and 7B can be adopted.

Next, the processing proceeds to step S7805, the user switches the own terminal to "store entry mode" in order to enter the store according to one embodiment of the present invention. The present invention is not limited thereto. However, in one embodiment of the present invention, the application on the user terminal can be switched between (1) the store entry mode, (2) the goods scan mode, (3) the goods settlement mode, and (4) the store exit mode, in a roughly classified view. The terminal application is used with the mode being switched in conformity with the scene.

In one embodiment, on the screen of the terminal application switched to the store entry mode, an authentication code, not shown, for entering the store is displayed (an information code, such as a two-dimensional code, to be waved over the gate entrance; hereinafter, also called an entry authentication code).

As already described above, in one embodiment, instead of the aforementioned authentication code for entry (displayed on the terminal application screen), the IC tag or the two-dimensional code preliminarily provided for the customer (user) may be carried and used as authentication code at entry to the shop. In this case, it is preferable that customer (user) information be associated with the IC tag or the two-dimensional code in the management server 21 or the like. Hereinafter, presentation of the code on the terminal application screen at entry and exit, can be replaced with the aforementioned IC tag or the two-dimensional code.

Next, in step S7807, the customer waves the entry authentication code displayed on the terminal (or the IC tag or the two-dimensional code carried by the customer), over the entrance of the gate 110. In one embodiment of the present invention, the code is optically read at the gate 110 and transmitted to the management server 21 or the store-side terminal, not shown, and an authentication process for the customer themselves is performed (step S7804). Alternatively, in step S7804, required information for entry may be verified.

Next, the processing proceeds to step S7806, and it is determined whether the authentication is affirmative (or whether initial information on the customer has already been registered or not).

Here, if No in step S7806, the processing returns to step S7802, and the user terminal may be caused to request the user terminal to register the initial setting information and the like at this time. If Yes in step S7806, the processing proceeds to step S7808, and the entrance of the gate 110 is opened (for example, a check door is opened). At this time, the management server 21 records the customer's passing through the entrance (entry). According to one embodiment of the present invention, the record at the time of entry is executed also by identity authentication through the camera or the like.

In step S7809, the customer passes through the entrance of the gate 110. According to one embodiment of the present invention, at this timing, the customer can receive the shopping basket. As required, the IC tag or the two-dimensional code carried by the customer can be attached to the shopping basket (or the IC tag or the two-dimensional code preliminarily attached to the shopping basket may be read through the customer terminal at this timing).

Next, the processing proceeds to step S7811, where the processing operations are different dependent on whether there are goods that the customer wishes to purchase. In step S7811, if there are goods that the customer wishes to purchase (Yes), the processing proceeds to step S7819, and if not (No), the processing proceeds to step S7813. In step S7813, the customer switches the own terminal to the store exit mode, and waves an exit authentication code (one mode of an exit code for the customer leaving a receiving area and exiting the store) over the exit of the gate 120b. That is, the customer purchases no goods and exits the shop. Accordingly, the customer is assumed to pass through the gate 120b.

According to one embodiment of the present invention, the code is optically read at the gate 120b (also called "buy-nothing lane"), and is transmitted to the management server 21. A display example of the exit authentication code is shown in FIG. 10. FIG. 10 shows the screen example of a user terminal 1000. The guidance message 1020 and the exit authentication code 1030 are arranged on the display 1010 of the terminal 1000. A known two-dimensional code can be adopted as the exit authentication code 1030.

The processing then proceeds to step S7815, and the exit of the gate 120b is opened (for example, a check door is opened). At this time, the customer's passing through the exit is recorded in the management server 21. According to one embodiment of the present invention, the record at the time of exit is executed also by identity authentication through the camera or the like.

In step S7815, the customer passes through the exit of the gate 120b (buy-nothing lane). Note that according to one embodiment of the present invention, the shopping basket is returned after or before the customer passes through the exit.

For facilitating understanding of the present invention, it is assumed that the entry authentication code and the exit authentication code are known two-dimensional codes, and the reading method is optical reading. However, the present invention is not limited thereto. Alternatively, an authentication method according to a magnetic reading method or a known near field wireless communication technique can be adopted (hereinafter, the same applies).

According to one embodiment of the present invention, if goods are scanned in the store in steps S7819 and S7810, a flag of scanning in the store may be turned on in a table, not shown, in the management server or the like, thus allowing management thereof.

In step S7821, for example, the settlement process is performed in the store (for example, a settlement person is applied through the IC tag or the two-dimensional code attached to the shopping basket, and the settlement is performed by image-recognizing or scanning the goods in the shopping basket). The processing then proceeds to step S7823, and the customer switches the own terminal to the store exit mode, and the exit authentication code is displayed. The code is read at the gate 120a, and is transmitted to the management server 21.

In step S7825, the customer waves the exit authentication code over the exit of gate 120a (also called "having-bought (scheduled-to-be-bought) lane"). The exit of the gate 120a is opened (for example, a check door is opened). At this time, the customer's passing through the exit is recorded in the management server 21. According to one embodiment of the present invention, the record at the time of exit is executed also by identity authentication through the camera or the like.

Note that according to another embodiment of the present invention, the settlement to step S7821 can be "temporary settlement" in some cases.

The processing returns to step S7821, and the description is continued in further detail. In the case of settlement in the store, a settlement process request is issued from the user terminal to the management server or the like. In step S7822, the settlement process is performed by the management server or the like in response thereto (this settlement process may be a temporary settlement process). Subsequently, in step S7824, a settlement completion notification is issued from the management server or the like. In step S7823, the user terminal receives the settlement completion notification, and the exit authentication code is displayed on the terminal screen as required (in the case of the temporary settlement process, steps S7824 and S7823 are omitted and can be processed at a real settlement).

In step S7825, the user receives exit authentication at the gate 120a, and passes through the gate. According to one embodiment of the present invention, the shopping basket is returned after or before the customer passes through the exit.

In step S7825 and corresponding step S7826, an exit record is made in the management server or the like. The gate 120a is unlocked (alternatively, the gate exit is opened). According to one embodiment of the present invention, the record at the time of exit can be executed also by identity authentication through the camera or the like.

In step S7827, the series of shopping flow is finished (in the case where the settlement in the store is completed).

(Function of Present Invention as Analysis System)

The goods purchase analysis assist system according to one embodiment of the present invention adopts the image recognition technique, as described above. In addition, the exit lane 120a for passage in the case of purchasing goods, and the exit lane 120b for passage in the case of purchasing no goods are individually provided. Accordingly, not only the customers' convenience, such as settlement at convenient timing for the customer, can be improved, but also various purchase needs of and the like of the customers can be analyzed.

Based on the specific example, the embodiments of the goods purchase analysis assist system and the like have thus been described. The embodiments of the present invention may be implemented as a method or a program for implementing a system or a device, and a recording medium or the like (for example, an optical disk, a magnetooptical disk, a CD-ROM, a CD-R, a CD-RW, magnetic tape, a hard disk, and a memory card) that stores the program.

The implementation modes of the program are not limited to application programs, such as object code to be compiled by a compiler, and program code to be executed by an interpreter. Modes of program modules or the like to be implemented in an operating system may be adopted.

Furthermore, not all the processes of the program are not necessarily required to be executed on a CPU on a control board. As required, it may be configured such that a part of or the entire processes are executed by another processing unit (DSP etc.) implemented on an extension board or an extension unit added to the main board.

All of the configuration elements described in this Specification (including the claims, the abstract, and the drawings), and/or all the steps of all the disclosed methods or processes can be combined with each other in any combination except combinations where these characteristics are exclusive to each other.

The characteristics described in this Specification (including the claims, the abstract, and the drawings) can each be replaced with alternative characteristics functioning for the same object, an equivalent object, or a similar object, unless clearly denied. Consequently, unless clearly denied, each of the disclosed characteristics is only an example of a comprehensive series of the same or equivalent characteristics.

Furthermore, the present invention is not limited to any of specific configurations of the embodiments described above. The present invention can be extended to all the novel characteristics described in this Specification (including the claims, the abstract, and the drawings) or combinations thereof, or all the novel methods or steps of processes described above, or combination thereof.

REFERENCE SIGNS LIST

10 Store
110, 120, 27 Gate
131 to 135, 26 Store shelves
141 to 145, 28 Camera
20 Goods purchase analysis assist system
21 Management server
22 Tablet terminal (one mode of user terminal device)
23 Mobile phone (one mode user terminal device)
24 to 25 PC (individual modes of user terminal device and/or store-side terminal)
37a to 37c, 38 Communication line
39 Public line (dedicated line, Internet, etc.)

What is claimed is:

1. A goods purchase analysis assist system comprising:
a management server that communicates with a terminal of a customer, and manages purchase of goods in a store by the customer;
a shopping basket, for the customer, having an IC tag or a visual information code;
an entry gate for the customer installed in the store;
exit gates for managing exit of the customer installed in the store, the exit gates including a first exit gate through which the customer having performed shopping passes, and a second exit gate through which the customer having not performed shopping passes, wherein
the management server associates the customer with the shopping basket by receiving information of the IC tag or visual information code scanned by the terminal of the customer and information of the terminal of the customer,
the IC tag or visual information code is scanned at the time of payment or when the shopping basket is returned when the customer passes through the first or second exit gate, and
the management server manages entry and exit of customers passing through the entry gate and the exits gates based on the information of the terminal of the customer linked to the information of the IC tag or visual information code of the returned shopping basket.

2. The system according to claim 1, wherein the terminal of the customer has at least a goods scan mode, and a goods settlement mode for a goods settlement process to be executed after a goods scan process in the goods scan mode, and the goods scan process in the goods scan mode and the goods settlement process in the goods settlement mode are executed independently in or out of the store.

3. The system according to claim 1,
wherein the store is further provided with a camera, and the management server recognizes and manages, through the camera, entry and exit of the customer into and from the store.

4. A method executed on a goods purchase analysis assist system comprising a management server that communicates with a terminal of a customer, and manages purchase of goods in a store by the customer:

a shopping basket, for the customer, having an IC tag or a visual information code;

an entry gate for the customer;

exit gates for managing exit of the customer, the exit gates including a first exit gate through which the customer having performed shopping passes, and a second exit gate through which the customer having not performed shopping passes, the method comprising:

receiving information of the IC tag or visual information code scanned by the terminal of the customer and information of the terminal of the customer;

associating the customer with the shopping basket based on the received information of the IC tag or visual information code and information of the terminal of the customer;

receiving the information of IC tag or visual information code of the shopping basket at the time of payment or when the shipping basket is returned when the customer passes through the first or second exit gate; and managing entry and exit of customers passing through the entry gate and the exits gates based on the information of the terminal of the customer linked to the information of the IC tag or visual information code of the returned shopping basket.

5. The method according to claim 4, wherein the terminal of the customer has at least a goods scan mode, and a goods settlement mode for a goods settlement process to be executed after a goods scan process in the goods scan mode, and the goods scan process in the goods scan mode and the goods settlement process in the goods settlement mode are executed independently in or out of the store.

6. The method according to claim 4, wherein the store is further provided with a camera, and the method further comprises a step to cause the management server to recognize and manage, through the camera, entry and exit of the customer into and from the store.

* * * * *